United States Patent [19]
Mork

[11] 3,813,067
[45] May 28, 1974

[54] ATTITUDE STABILIZATION SYSTEM
[75] Inventor: Halbert Louis Mork, Palos Verdes Peninsula, Calif.
[73] Assignee: TRW Inc., Redondo Beach, Calif.
[22] Filed: June 29, 1972
[21] Appl. No.: 267,575

[52] U.S. Cl............ 244/3.22, 244/1 SA, 244/3.15
[51] Int. Cl. ..................... F41g 7/00, B64c 17/06
[58] Field of Search ......... 244/3.15, 3.2, 3.22, 1 SA

[56] References Cited
UNITED STATES PATENTS

| | | |
|---|---|---|
| 3,189,298 | 6/1965 | Buckingham et al............ 244/1 SA |
| 3,258,226 | 6/1966 | Deschamps et al.............. 244/3.2 |
| 3,429,524 | 2/1969 | Buckingham et al............ 244/1 SA |
| 3,493,194 | 2/1970 | Kurzhals....................... 244/3.2 X |
| 3,547,381 | 12/1970 | Shaw............................ 244/3.2 X |

Primary Examiner—Samuel Feinberg
Assistant Examiner—James M. Hanley
Attorney, Agent, or Firm—Daniel T. Anderson; Stephen J. Koundakjian; William B. Leach

[57] ABSTRACT

An attitude stabilization and control system is disclosed for providing accurate control and stabilization of a space vehicle traveling in a circular or near circular orbit relatively to a body such as the earth. A reaction wheel operated at a modulated bias speed is mounted in a gimbal system having two axes of freedom. The speed of the wheel and the gimbal angles are controlled by electronically implemented logic based upon only two-axis attitude error sensing to provide three-axis stabilization and control in the presence of disturbances. Secular disturbances cause growth in the gimbal angles and the wheel speed and are intermittently compensated by actuation of small thrusters or magnetic coils.

11 Claims, 7 Drawing Figures

ATTITUDE STABILIZATION SYSTEM

BACKGROUND OF THE INVENTION

The need for providing attitude control and stabilization of one body with respect to another is often encountered in the field of spacecraft control and more particularly with respect to orbiting satelites, and the invention described herein generally applies thereto.

More specifically, it will find particular use in association with satellites of the type which are not spin stabilized, commonly denoted as fully stabilized and having one axis (yaw) directed toward the oribited body, the second axis (pitch) normal to the plane of the orbit and the third axis (roll) in the direction of velocity.

Stabilization and control of orbiting vehicles in the presence of periodic and secular torques have been much studied. Common environmental disturbance torques acting upon an orbiting satellite include aerodynamic, magnetic, and gravity gradient forces. Aerodynamic disturbances tend to dominate at lower altitudes while magnetic and gravity disturbances are particularly important at intermediate altitudes, and solar radiation pressure imbalances are relatively significant at high altitudes. Due to the orbit path of the satellite, which often is elliptical, some of these forces contribute to periodically recurring disturbances. Such disturbances are to be distinguished from secular disturbances that are fixed in stationary coordinates.

Non-spin, fully stabilized earth pointed satellites require three axes of control or two axes of control and a supplementary means of restraining rotation about the third (earth pointed) axis (e.g., by using a large rotating flywheel).

To this end, three orientation sensors have been used as a means of detecting attitude errors. For example, two earth horizon sensors provide error signals about the roll and pitch axes while a sun sensor, a star sensor or a gyroscope can provide the yaw axis error signal. These error signals are processed by appropriate logic to control momentum producing means, thereby maintaining the preferred orientation of the orbiting vehicle when subjected to disturbance torques. Difficulties can be encountered sensing the yaw axis error. Sun sensors, while being very reliable, can be used only when the sun is not occulted by the earth. Sensors which derive error signals by viewing stars can experience difficulty acquiring the preferred star and discriminating against bright objects such as the moon, the sun, or glint from spacecraft appendages. Gyroscopes may not have the requisite reliability and are restrictive in yaw sensing accuracy.

As is known in the prior art, a reaction wheel is a typical momentum source. By modulating the speed of the reaction wheel, the momentum will be similarly modulated and disturbance torques may be countered. A typical implementation has been to provide three such reaction wheels; one wheel for each axis and each controlled via one of three error signals. The use of multiple wheels amounts to a relatively large overall large weight and is subject to the sensor limitations above.

Another approach has been to provide a single reaction wheel having a large bias momentum, e.g., on the order of 300 foot-pounds-second. In such a system, two axes of stabilization (roll and yaw) are not actively controlled; the accuracy is dependent upon the large wheel momentum off-setting relatively small torque disturbances. The pitch axis disturbances are compensated by changes in the wheel speed. The use of a large reaction wheel necessitates a weight penalty and requires a relatively large power source.

It is accordingly an object of the present invention to provide an attitude stabilization system which is not subject to these and other disadvantages of the prior art.

It is a further object of the present invention to provide an attitude stabilization system yielding three axis of control based upon only two-axis orientation sensing.

It is yet another object of the present invention to provide a momentum wheel attitude stabilization system that is relatively small, light weight, and having high reliability and accuracy.

SUMMARY OF THE INVENTION

The attitude stabilization and control system of the invention herein is directed to use in a vehicle orbiting a body. A set of orthogonal reference axes are arbitrarily defined such that a pitch axis is perpendicular to the orbit plane, a yaw axis intercepts the center of the body being orbited, and a roll axes is nominally coincident with the vehicle velocity vector.

Attitude sensors carried by the vehicle sense angular deviations of the vehicle about the pitch and roll axes only. These error signals are processed to commond changes in momentum along any one, or a combination, of the reference axes. Momentum control logic is provided to process the pitch error signal for pitch momentum command, and further to process the roll error signal and measured values of roll and yaw momentum to yield roll and yaw momentum command signals.

Excess stored momentum along the pitch and roll axes is intermittently removed by thruster firings or continuously removed by energizing magnetic coils. Removal of momentum from the yaw axis is not required; roll and yaw momenta exchange every one-quarter orbit as a consequence of rotation abut the orbited body.

DESCRIPTION OF THE PREFERRED EMBODIMENTS

Figure 1:
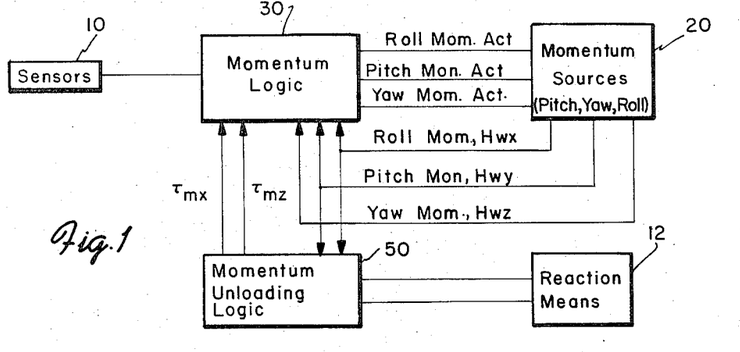
FIG. 1 is a general functional diagram of an attitude stabilization and control system in accordance with the teachings of the present invention.

Referring to FIG. 1, a general function diagram, there is shown a pair of sensors 10 which serve to generate roll and pitch attitude error signals representative of angular deviations of the vehicle from a preferred orientation, a momentum source of sources 20 directed along the reference axes of the vehicle, and momentum control logic 30 for relating the error signals to independently controlled changes in the momentum along the reference axes. In the case of earth orbiting spacecraft, to which the remainder of this description will be directed, the error signals may be provided by such means as infrared scanners, horizon sensors, or similar attitude sensing means. In order to remove excess momentum, reaction means 12 and momentum unloading logic 50 are included.

The momentum source 20 includes means for producing momentum changes along any one of three arbitrarily directed orthogonal reference axes. One or more reaction wheels are used to provide a momentum source along one of the axes, defined as the pitch axis. Thus, one output of momentum control logic 30 is a pitch momentum actuator signal and one output from the momentum source 20 is the pitch momentum.

It can be shown that the two error signals from the sensors 10 may be related to and provide control of the momentum source along each axis by the following relationships:

$$H_{wxc} = K_1\phi + \int (K_2\phi + \omega_0 H_{wz})dt + \int \tau_{mx}dt,$$
$$H_{wyc} - H_B = K_5\theta + K_6 \int \theta dt, \text{ and}$$
$$H_{wzc} = H_B\phi - \omega_0 \int [H_{wx} + K_4'(-H_{wz} + H_B\phi)]dt - K_4'H_{wx} + \int (\tau_{mz} + K_4\tau_{mx})dt$$

where $H_{wxc}$, $H_{wyc}$ and $H_{wzc}$ are commanded momenta along roll, pitch and yaw, respectively, $H_{wx}$ and $H_{wz}$ are measured roll and yaw momenta, respectively, $H_B$ is pitch momentum bias, $\theta$ is pitch attitude error, $\phi$ is roll attitude error, $\omega_0$ is the orbital rate, $K_1$, $K_2$, $K_4$, $K_4'$ $K_5$, and $K_6$ are control gains and $\tau_{mx}$ and $\tau_{mz}$ are estimated momentum unloading torques.

The momentum source and means for changing that momentum value may be implemented in a variety of ways including the use of a reaction wheel along each of the remaining two axes. Thus, all three momentum control logic outputs would be motor speed controls and all three momentum source outputs would be wheel speeds.

While three degrees of momentum control may be provided by using three separate reaction wheels, a double gimbaled, single wheel system is preferred. As will be seen, the measured momentum in roll and yaw, $H_{wx}$ and $H_{wz}$, will then be a function of the gimbal frame angles and the control logic will be so structured.

Figure 2:
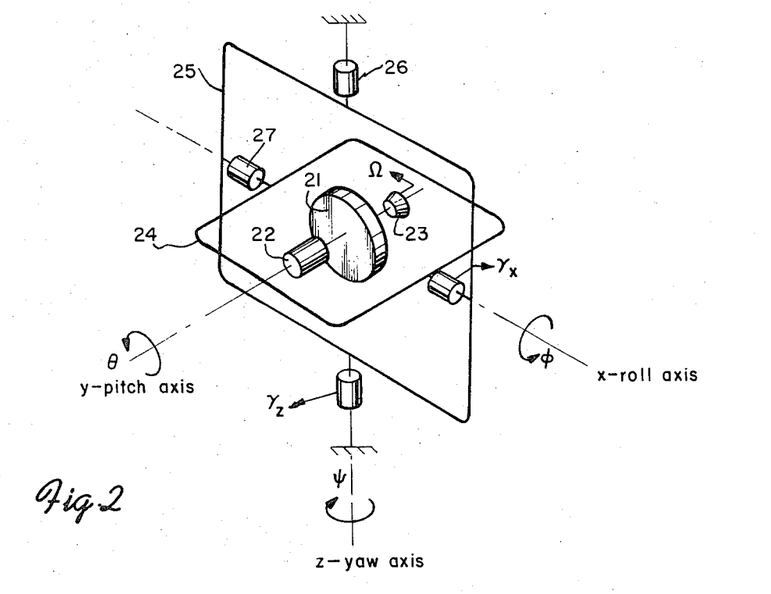
FIG. 2 is a diagrammatic representation of gimbaled reaction wheel assembly which may be used as the momentum source of FIG. 1.

In accordance with the preferred momentum source mechanism, FIG. 2 is a schematic representation of a gimbaled reaction wheel assembly which may be used as the momentum source 20 in FIG. 1. Included in FIG. 2 are the reference axes, labeled $x$, $y$ and $z$, and the reference angles $\phi$, $\theta$ and $\psi$ which are representative of vehicle deviations from a preferred orientation of the reference axes. Thus, the error signals from the sensors 10 provide a measure of $\phi$ and $\theta$. The teachings of the invention herein do not require a knowledge of the third deviation angle $\psi$ (yaw).

In the preferred embodiment of a momentum source, FIG. 2, a change in momentum about the pitch axis may be produced by changing the speed of the reaction wheel. Momentum changes about the roll and yaw axis may be produced by manipulating the gimbal devices. Thus, if the angular positions of the gimbals is measured, $\gamma_x$ and $\gamma_z$, a representation of the momentum values, $H_{wx}$ and $H_{wz}$, is obtained.

The mechanism of FIG. 2 includes a reaction wheel 21 rotatable about the pitch axis, labeled $y$, thereby providing pitch control. The wheel 21 is driven by a motor 22 and its rotational speed, $\Omega$, is measured by a tachometer 23. The wheel 21 is mounted in a roll-axis gimbal frame 24 which is in turn carried by a yaw-axis gimbal frame 25.

The yaw-gimbal frame is controlled by a gimbal motor unit 26 and similarly, another gimbal motor unit 27 controls the position of the roll-gimbal frame. Each gimbal frame further includes an indicator for providing an electrical output signal representative of the gimbal angular position. Such indicators are generally known as resolvers or encoders.

To limit the excursions of the gimbal angles from null and the wheel speed from the bias, a momentum unloading means for countering the effects of stored secular disturbances may be added which includes the momentum unloading control 50 and the reaction mechanism 12 of FIG. 1. The reaction mechanism 12 may be conventional means such as cold or hot gas thrusters, or where appropriate magnetic coils that interact with the magnetic field of the rotated body.

As will be appreciated from the discussions of the figures, only two-axis attitude error sensing is utilized. The momentum unloading system will remove the effect of secular disturbances about the roll, pitch and yaw axes. The yaw accuracy of the system may be further enhanced by providing torque compensation logic which models the expected disturbance about the roll and yaw axes and provides correction signals to the gimbal controls.

In order to implement the stabilization system in accordance with this invention, the foregoing set of roll and yaw momentum command control laws have been modified for a gimbaled reaction wheel system as follows:

$$\gamma_{zc} = K_1'\phi + \int (K_2'\phi - \omega_0\gamma_x)dt + (1/H_B) \int (\tau_{dx} + \tau_{mx})dt \text{ and}$$
$$\gamma_{xc} = -\phi - K_4' \gamma_z - \int [\omega_0 (\gamma_z + K_4' (\gamma_x + \phi)) - (1/H_B) (\tau_{dz} + \tau_{mz}) - (K_4'/H_B)(\tau_{dx} + \tau_{mx})]dt$$

Each of these equations describes the general case for the yaw gimbal command signal and roll gimbal command signal, respectively. The variables and constants in these equations are:

$\phi$, $\theta$ attitude deviation angles about $x$ and $y$ axes, $\gamma_x$, $\gamma_z$ gimbal angles, $\omega_0$ orbital rate, $H_B$ bias momentum of reaction wheel $K_1'$, $K_2'$ and $K_4'$ are control gains $\tau_{dx}$, $\tau_{dz}$ disturbance torques on stabilized vehicle about the $x$ and $z$ axes, and $\tau_{mx}$, $\tau_{mz}$ estimated momentum unloading torques.

Figure 3:
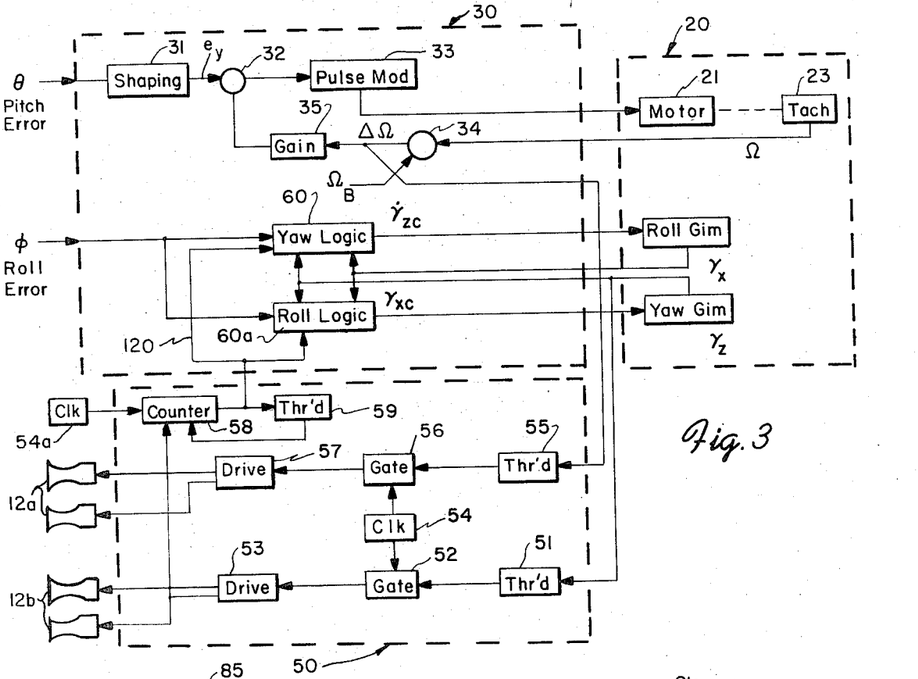
FIG. 3 is a schematic diagram showing further details of the momentum control logic and the momentum unloading logic of FIG. 1.

Referring now to FIG. 3, there is shown one embodiment of the invention wherein the momentum unloading system utilizes thrusters. In this implementation of the invention, the estimated disturbance torques on the stabilized vehicle are deleted from the gimbal command equations.

As shown in FIG. 3, the pitch error signal is impressed upon a pitch command circuit that includes a shaping circuit 31 which serves to provide an output signal $e_y$ in accordance with the expression: $e_y = K_p \dot{\theta} + \theta$ wherein $K_p$ is a rate gain chosen to provide the desired damping. This output is then coupled to a summing circuit 32 the output of which is impressed upon a pulse modulator circuit 33. The pulse modulator 33 controls the motor of the reaction wheel 21 of the gimbaled reaction wheel assembly 20.

The wheel speed signal is taken from the tachometer 23 and coupled to a feedback summing circuit 34 which has a second input designated $\Omega_B$ which is the wheel bias speed. The output of circuit 34 is the differential wheel speed $\Delta\Omega$. The output is coupled to a pitch gain circuit 35 having a linear proportional output representative of the differential wheel speed for values less than a selected threshold. For values above the threshold, the output is multiplied by a gain much larger than unity to prevent the wheel speed differential from further increasing. Such large buildup in wheel speed change are caused by secular disturbances and are compensated by the momentum unloading means 50 of FIG. 1.

Turning now to the generation of the yaw and roll gimbal command signals, as indicated in FIG. 3, the roll error signal generated by a roll orientation sensor such as an earth sensor or the like, as well as the yaw and roll gimbal angular position signals from the gimbal assembly, are coupled to a yaw logic circuit 60 and roll logic circuit 60a.

Another signal, herein referred to as a momentum unloading torque signal, is available on lead 120 and is derived from a momentum unloading means using magnetics or a torque compensation logic means, or both, as will be disucssed below. These circuits serve to implement the gimbal command control law equations heretofore set forth. The output of these circuits control the angular orientations of the yaw and roll gimbal frames. Changing the gimbal angles serve to cause reaction torques upon the vehicle carrying the reaction wheel assembly. The yaw and roll logic circuits will be further detailed.

Also as shown in FIG. 3 the system may include the momentum unloading control 50 of FIG. 1, a pitch and a roll reaction mechanism shown as pitch thrusters 12a, and roll thrusters 12b. Only two axes unloading is required since in orbit, momentum in roll and yaw exchange every one-quarter orbit. Secular momentum stored along the roll axis is proportional to the yaw gimbal angle. Excess momentum is removed by activating a roll thruster when the yaw gimbal angle exceeds a selected threshold. To this end, the unloading means 50 includes a roll threshold circuit 51 which is coupled to a thruster drive unit 53 through a gate 52. When the yaw gimbal exceeds the threshold, circuit 51 provides an output signal.

It would be undesirable to frequently actuate the thrusters. Therefore, a clock 54 drives the gate 52 to gate through the threshold output only at selected time intervals for a preset time. For example, a gate interval may be 1,000 seconds so that the threshold output must exist at that interval, otherwise the thruster is not activated.

In a similar manner the differential wheel speed is applied to a pitch thruster threshold circuit 55 which produces an output signal when the differential wheel speed exceeds a preselected value. This output is coupled to the pitch thruster drive unit 57 through gate 56.

The roll thruster output, in addition to activating the roll thruster 12b for a preselected duration, enables a counter 58 driven by clock 54a which provides an output $\tau_{mx}$ (momentum unloading torque about roll axis) that is impressed upon the yaw logic circuit 60 and the roll logic circuit 60a. The counter 58 is reset by a counter output threshold circuit 59 when the count reaches the required value.

Figure 4:
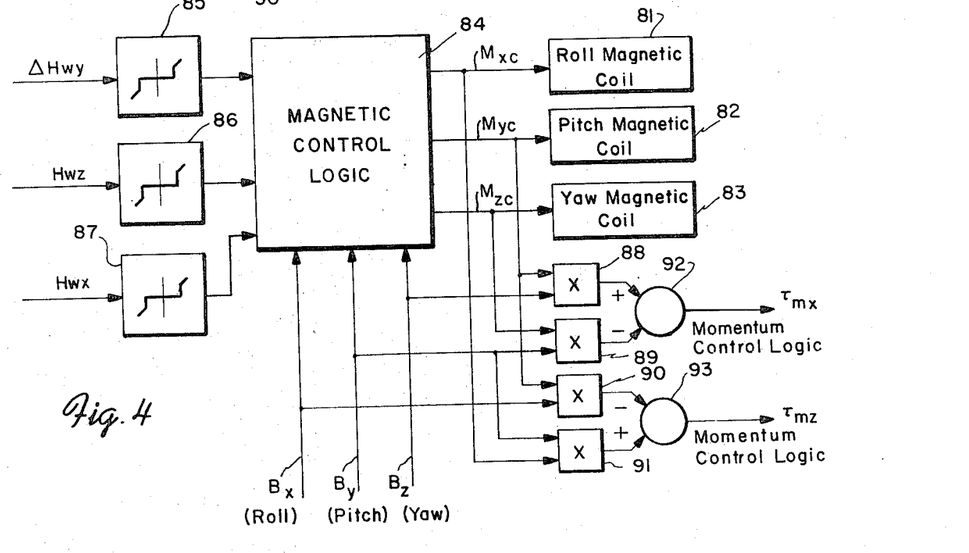
FIG. 4 is a schematic diagram of an alternative momentum unloading logic of FIG. 3.

A magnet reaction system is an alternative to the use of thrusters in the momentum unloading circuit 50. One implementation of a magnetic reaction system is shown in FIG. 4. Excessive momentum is unloaded by magnetic coils reacting with the earth's magnetic field. To this end, roll, pitch, and yaw magnetic circuit coils 81, 82 and 83 are activated by a control logic circuit 84.

Inputs to the control logic are the differential pitch momentum signal, a function of wheel speed, and yaw and roll momentum signals, functions of the yaw and roll gimbal angles. As in the case of thruster unloading, each of these signals is applied to threshold circuits 85, 86, 87. Other inputs include signals $B_x$, $B_y$, $B_z$ produced by magnetometers and which are proportional to the earth magnetic field along the $x$, $y$, and $z$ axes, respectively. The magnetic command outputs of logic means 84 are produced in accordance with the following:

$m_{xc} = - K_m[B_y H_{wz} - B_z \Delta H_{wy}]$
$m_{yc} = - K_m[B_z H_{wx} - B_x H_{wz}]$, and
$m_{zc} = - K_m[B_x \Delta H_{wy} - B_y H_{wx}]$, where $H_{wx}$, $\Delta H_{wy}$ and $H_{wz}$ are the stored momentum values.

As shown in FIG. 4, the magnetic circuit command signals are coupled to multiplier circuits 88, 89, 90, 91 as are the measured values $B_x$, $B_y$, $B_z$. The output signals of these multipliers, after processing by summing circuits 92, 93 provide signals representative of the momentum control torque about the roll and yaw axes. These signals are then processed in the roll and yaw logic circuits 60, 60a of FIG. 3.

Before turning to the implementation of the roll and yaw logic, it has herein been noted that system accuracy may be further enchanced by providing torque compensation logic which models expected disturbances about the roll and yaw axes. For this purpose, the circuit of FIG. 5 is shown.

As shown therein, a clock 100 drives a resolver unit 101 whose function it is to generate sine and cosine output signals. These periodic signals are multiplied by various coefficients by multipliers 102, 103, 104, 105. The coefficients are selected to approximate disturbances acting upon the vehicle and about the yaw and roll axes which occur at orbital frequency. The output signals of multipliers 102 – 105 are impressed upon summing circuits 106, 107 as shown which have additional inputs, $A_{xo}$ and $A_{zo}$, that are constants in the modeling equations. The outputs of the summing circuits 106, 107 are representative of disturbance torque estimates acting upon the vehicle and may serve as inputs to the yaw and roll logic 60, 60a of FIG. 3.

Figure 5:
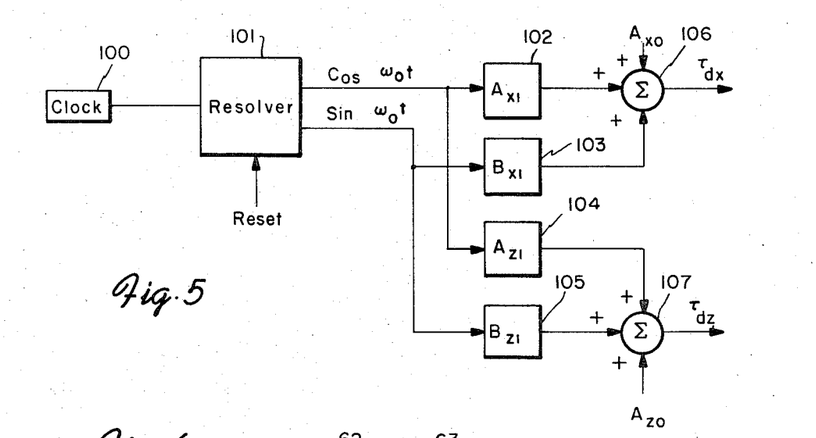
FIG. 5 is a schematic diagram of compensation logic useful in improving the accuracy of the attitude stabilization system herein.

It can be seen that the signals generated by the momentum unloading circuits of FIGS. 3 and 4, and of the disturbance torque modeling circuit of FIG. 5 serve as inputs to the logic circuits 60, 60a of FIG. 3. Also, it can be seen that the roll and yaw gimbal command equations heretofore set forth are general expressions that will accommodate any of the torque signals generated by the circuitry of FIGS. 4 or 5.

Figure 6:
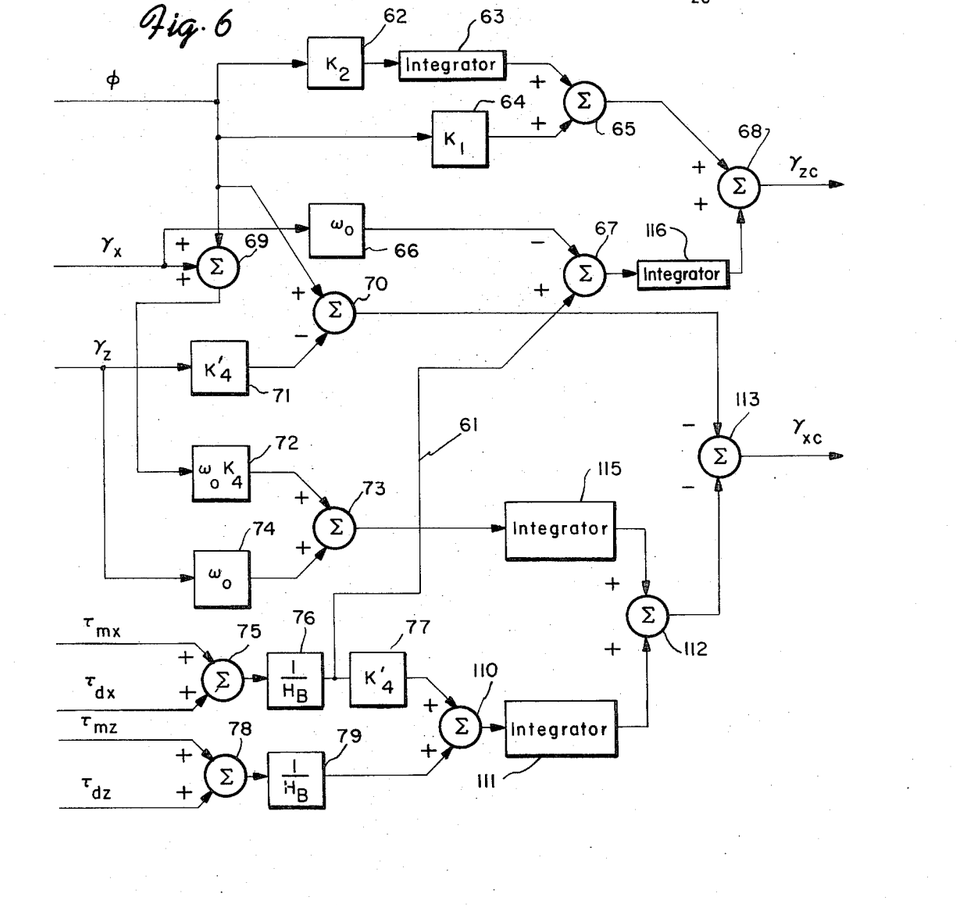
FIG. 6 is a schematic diagram of the yaw and roll logic circuits of FIG. 3.

In FIG. 6 there is shown circuit means for implementing the yaw and roll equations and which correspond to the logic circuit blocks 60, 60a of FIG. 3. As already noted in FIG. 3, input signals to the yaw logic circuit 60 include the roll error signal, the roll and yaw gimbal angle signals, a compensation signal on lead 120 if thrusters are used for excess momentum removal.

The roll attitude error sensor signal is processed to provide a signal representative of such error multiplied by a constant $K_2$. This product may be generated by impressing the roll error signal, upon the input of a multiplier 62, an amplifier having a gain of $K_2$ in the case of analog implementation, or a shift register in the case of digital implementation. This signal is then input to integrator 63.

The roll attitude error signal is also processed by multiplier 64. These foregoing products are added in a summing circuit 65.

The yaw logic segment of the gimbal torque command circuit also processes the roll gimbal angle signal which serves as an input to a multiplier 66 representative of orbital rate. This product is added in summing circuit 67 along with the compensation signal on lead 61 and the sum input to integrator 116. The outputs of summing circuit 65 and integrator 116 are added by anothr another circuit 68 to yield the yaw gimbal command signal which is the output of the yaw logic circuit 60 of FIG. 3.

The remainder of FIG. 6 relates to the implementation of the second of the gimbal command equations herein and corresponds to the roll logic circuit 60a of FIG. 3. Input signals include the roll attitude error signal, the roll and yaw gimbal angle signals, a momentum unloading torque signal on lead 120, also shown in FIG. 3. The other inputs, consisting of disturbance torque and momentum control torque signals are available when a magnetic momentum unloading means of FIG. 4 is used, and/or torque compensating logic of FIG. 5 is utilized.

As shown, the roll error signal $\phi$ is combined in summing circuit 70 to the product of the yaw gimbal angle signal and $K_4'$ provided at the output of multiplier 71. The output of summing circuit 70 therefore represents the terms $\phi - K_4'\gamma_z$ of the roll gimbal command equation.

Clearly then, the first integral term can be similarly implemented by processing the output of summing circuit 69 by the multiplier 72 which is then added by summing circuit 73 to the output of multiplier 74. The output of summing circuit 73 may then be integrated by an integrator 115.

Similarly, the remaining integral term, to the extent the terms thereof are utilized, is carried out by adding the control torque term from the momentum unloading means (FIGS. 3 or 4) and the disturbance torque from the torque compensation logic (FIG. 5) in a summing circuit 75 whose output is processed by multiplier 76 representative of $1/H_B$. This output serves as the compensation signal on lead 61 and as an input to multiplier 77. Also, as shown in FIG. 6, the remaining control and disturbance torque terms are added by summing circuit 78, processed by multiplier 79 whose output is added to the output of multiplier 77 by summing circuit 110. The output thereof may then be processed by an integrator 111 whose output is added to the output of the first integrator 115 by summing circuit 112 to thereby provide the complete integral term of the roll gimbal command equation.

Finally, the outputs of summing circuits 70, 112 are added by summing circuit 113 to yield the desired roll gimbal command signal.

Figure 7:
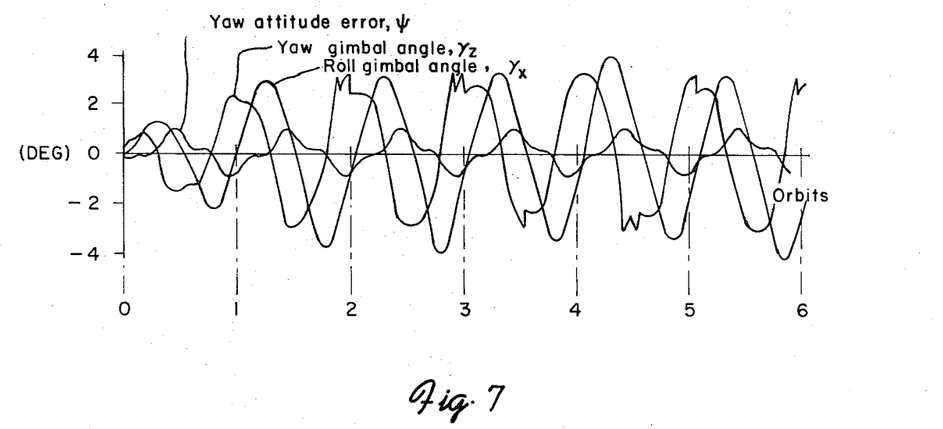
FIG. 7 is a graphical presentation of the performance of the attitude stabilization system.

System performance over six orbits is shown by FIG. 7 for a satellite in geosynchronous orbit. The variables shown are the yaw attitude error, the roll gimbal angle and the yaw gimbal angle. The pitch and roll attitude errors are not shown, as they are maintained at very small values (typically $< 0.05°$, the roll and pitch sensor thresholds). The torques acting upon the spacecraft are due to solar pressure imbalances about the spacecraft mass center. The secular torque dominates and has a magnitude of $2 \times 10^{-6}$ foot-pound. The bias momentum of the reaction wheel is 7 foot-pound-second.

The yaw attitude error shows a periodicity of one orbit (equals 1 day) with a magnitude of approximately $0.9°$. The yaw gimbal angle excursions starting from null shows a buildup and reaches $3°$ at approximately two orbits, at which the momentum unloading threshold is reached and the roll thruster is activated, momentum is removed along the roll axis and the yaw gimbal angle is reset approximately $0.8°$. Subsequent momentum removals are indicated by abrupt changes in the yaw gimbal angle. A comparison of roll and yaw gimbal angles shows the momentum interchange every one-quarter orbit, with the roll gimbal excursions exceeding the yaw gimbal excursions due to the momentum accumulation over the one-quarter orbit.

The stabilization and control system herein described provides for a relatively light weight and mechanically simple system than systems heretofore proposed and requires only two axis attitude error information.

What is claimed is:

1. An attitude stabilization and control system for a space vehicle traveling in an orbit about a body, the vehicle having orthogonal axes defined such that a pitch axis is nominally perpendicular to the orbit plane, a yaw axis nominally intercepts the center of the orbited body, and a roll axis nominally coincides with the velocity vector, the axes to have a preferred position with respect to the body, the system comprising:

a pitch orientation sensor having an output representative of the angular deviation of the vehicle from a stabilized position about the pitch axis;

a roll orientation sensor having an output representative of the angular deviation of the vehicle fromthe stabilized position about a roll axis;

a source of momentum directed along each of the reference axes and having a bias value along the pitch axis;

means operable on said momentum source for independently changing the momentum along each of the reference axes;

momentum measuring means associated with said momentum source for providing momentum output signals representative of the instantaneous momentum along the reference axes;

pitch control logic means having inputs coupled to said pitch sensor, to the output of s aid momentum measuring means representative of pitch momentum, and an output coupled to said momentum source, through said pitch momentum changing means, for variably controlling the pitch momentum; and yaw and roll control logic means coupled to said roll sensor and to the outputs of said momentum measuring means representative of yaw and pitch momentum, and having outputs coupled to said momentum source, through said yaw and roll momentum changing means, for variably controlling the roll and yaw momenta thereby producing reaction torques which substantially reorientate the vehicle to the preferred stabilized orientation.

2. The attitude stabilization and control system of claim 1 wherein said pitch control logic means and said yaw and roll control logic means include means for generating momentum command signals in accordance with:

$H_{wxc} = K_1 \phi + \int (K_2\phi + \omega_o H_{wz})dt,$ $H_{wyc} - H_B = K_5\theta + K_6 \int \theta dt,$ $H_{wzc} = H_B\phi - \omega_o \int (H_{wx} + K_4'(-H_{wz} + H_B\phi))dt - K_4'H_{wx}$ where $H_{wxc}, H_{wyc}, H_{wzc}$ are commanded momenta along roll, pitch and yaw, respectively, $H_{wx}, H_{wz}$ are measured roll and yaw momenta, respectively, $H_B$ is pitch momentum bias, $\omega_o$ is orbital rate, $K_1, K_2, K_4', K_5, K_6$ are control gains.

3. The attitude stabilization and control system of claim 2 further comprising:

reaction means for producing control torque on the vehicle, and momentum unloading logic means coupled to said reaction means, to said pitch control logic means, and to said yaw and roll control logic means for actuating said reaction means in response to predetermined stored momentum conditions.

4. The attitude stabilization and control system of claim 1 wherein:

said source of momentum includes a reaction wheel;

said yaw and roll momentum changing means comprises:

yaw and roll gimbal means coupled to said reaction wheel and imparting two degrees of freedom thereto; and yaw and roll gimbal drive means coupled to each said gimbal means for selectively positioning each gimbal means;

said pitch momentum changing means comprises drive means coupled to said reaction wheel for operating the wheel at selected angular speeds; and said momentum measuring means includes:

sensing means for generating a signal representative of wheel speed; and indicating means coupled to each said gimbal means for generating signals representative of the position of each said gimbal means.

5. The attitude stabilization and control system of claim 4 further comprising:

reaction means for producing control torques on the vehicle, and momentum unloading logic means coupled to said reaction means, to said pitch control logic means, and to said yaw and roll control logic means for actuating said reaction means in response to predetermined stored momentum conditions.

6. The attitude stabilization and control system of claim 5 wherein said reaction means includes:

pitch thrusters, and roll thrusters and said momentum unloading logic means includes:

a first threshold circuit coupled to said pitch control logic means responsive to the differential wheel speed, and a second threshold circuit coupled to said yaw and roll control logic means responsive to a yaw gimbal position signal whereby said thrusters may be actuated at predetermined values of the yaw gimbal position signal.

7. The attitude stabilization and control system of claim 4 wherein said yaw and roll control logic means includes means for generating the yaw and roll gimbal command signal in accordance with:

$\gamma_{zc} = K_1'\phi + \int (K_2'\phi - \omega_o\gamma_x)dt + (1/H_B) \int \tau_{mx}dt$ $\gamma_{xc} = -\phi K_4'\gamma_z - \int [\omega_o\gamma_z + \omega_o K_4'(\gamma_x + \phi) - \tau_{mz}/H_B - K_4'\tau_{mx}/H_B]dt$ where $\phi$ is a roll axis deviation angle, $\gamma_x$ and $\gamma_z$ are deviations of the gimbal means from a predetermined position, $\omega_o$ is the orbital rate of the vehicle about the body, $H_B$ is the bias momentum of the reaction wheel, and $\gamma_{mx}$ and $\gamma_{mz}$ are momentum control torques on the vehicle produced by said reaction means.

8. The attitude stabilization and control system of claim 7 further comprising:

torque compensation logic means coupled to said yaw and roll control logic means for generating signals representative of estimated torques on the vehicle due to disturbances not otherwise measured.

9. The attitude stabilization and control system of claim 8 wherein said yaw and roll control logic means includes further means for generating the yaw and roll gimbal command signals in accordance with:

$\gamma_{zc} = K_1'\phi + \int (K_2'\phi - \omega_o\gamma_x)dt + (1/H_B) \int (\tau_{dx} + \tau_{mx})dt$ and $\gamma_{xc} = -\phi - K_4'\gamma_z - \int [\omega_o\gamma_z + \omega_o K_4'(\gamma_x + \phi) (1/H_B)(\tau_{dz} = \tau_{mz}) - (K_4'/H_B)(\tau_{dx} = \tau_{mx})]dt$ 10. The attitude stabilization and control system of claim 1 further comprising:

reaction means for producing control torque on the vehicle, and momentum unloading logic means coupled to said reaction means, to said pitch control logic means, and to said yaw and roll control logic means for actuating said reaction means in response to predetermined stored momentum conditions.

11. The attitude stabilization and control system of claim 10 wherein said pitch control logic means and said yaw and roll control logic means includes means for generating momentum command signals in accordance with:

$Hxhd wxc = K_1\phi + \int (K_2\phi + \omega_o H_{wz})dt + \int \tau_{mx}dt + \int \tau_{dx}dt,$ $H_{wyc} - H_B = K_5\theta + K_6 \int \theta dt,$ $H_{wzc} = H_B\phi - \omega_o \int (H_{wx} + K_4'(-H_{wz} + H_B\phi))dt, - K_4'H_{wx} + \int (\tau_{mz} + K_4'\tau_{mx})dt + \int (\tau_{dz} + K_4'\tau_{dx})dt,$ where $H_{wxc}, H_{wyc}, H_{wzc}$ are commanded momenta along roll, pitch and yaw, respectively, $Hx_{wx}, H_{wz}$ are measured roll and yaw momenta, respectively, $H_B$ is pitch momentum bias, $\omega_o$ is orbital rate, $K_1, K_2, K_4', K_5, K_6$ are control gains, $\tau_{my}$ and $\tau_{mz}$ are momentum unloading torques, and $\tau_{dx}$ and $\tau_{dz}$ are estimated disturbance torques.

* * * * *

UNITED STATES PATENT OFFICE
CERTIFICATE OF CORRECTION

Patent No. 3,813,067  Dated May 28, 1974

Inventor(s) Halbert L. Mork

It is certified that error appears in the above-identified patent and that said Letters Patent are hereby corrected as shown below:

Column 2, line 39, correct "abut" to read -- about --.

Column 3, line 24, correct the formula to read as follows:

$$H_{wxc} = K_1\phi + \int(K_2\phi + \omega_o H_{wz})dt + \int \tau_{mx} dt,$$

Column 3, line 35, correct "θ" to read -- $\phi$ --.

Column 4, line 46, correct the formula to read as follows:

$$(1/H_B)(\tau_{dz} + \tau_{mz}) - K_4'/H_B)(\tau_{dx} + \tau_{mx})] dt$$

Column 5, line 33, correct "disucssed" to read -- discussed --.

Column 7, line 42, correct "to" to read -- with --.

Column 9, line 2, correct "mementum" to read -- momentum --.

Column 9, line 3, correct "pitch" to read -- roll --.

Column 10, line 16, correct the formula to read as follows:

$$\gamma_{xc} = -\phi - K_4' \gamma_z - \int[\omega_o \gamma_z + \omega_o K_4'(\gamma_x + \phi) - \tau_{mz}/H_B$$

Column 10, line 22, correct "$\gamma_{mx}$ and $\gamma_{mz}$" to read "$\tau_{mx}$ and $\tau_{mz}$"

Column 10, line 38, correct the formula to read as follows:

$$- (1/H_B)(\tau_{dz} + \tau_{mz}) - (K_4'/H_B)(\tau_{dx} + \tau_{mx})] dt$$

(Continued on page 2)

UNITED STATES PATENT OFFICE
CERTIFICATE OF CORRECTION

Patent No. 3,813,067　　　　Dated May 28, 1974

Inventor(s) Halbert L. Mork

It is certified that error appears in the above-identified patent and that said Letters Patent are hereby corrected as shown below:

Column 10, line 53, correct the formula to read as follows:

$$H_{wxc} = K_1\phi + \int(K_2\phi + \omega_o H_{wz})dt + \int\tau_{mx}dt +$$

Column 10, line 61, correct to read as follows:

$H_{wx}$, $H_{wz}$ are measured roll and yaw momenta, re-

Column 10, line 66, correct "$\tau_{my}$" to read "$\tau_{mx}$"

Signed and sealed this 4th day of March 1975.

(SEAL)
Attest:

RUTH C. MASON
Attesting Officer

C. MARSHALL DANN
Commissioner of Patents
and Trademarks